E. T. ORTON.
FENDER FOR AUTOMOBILES.
APPLICATION FILED AUG. 25, 1914. RENEWED OCT. 2, 1916.
1,205,381.
Patented Nov. 21, 1916.
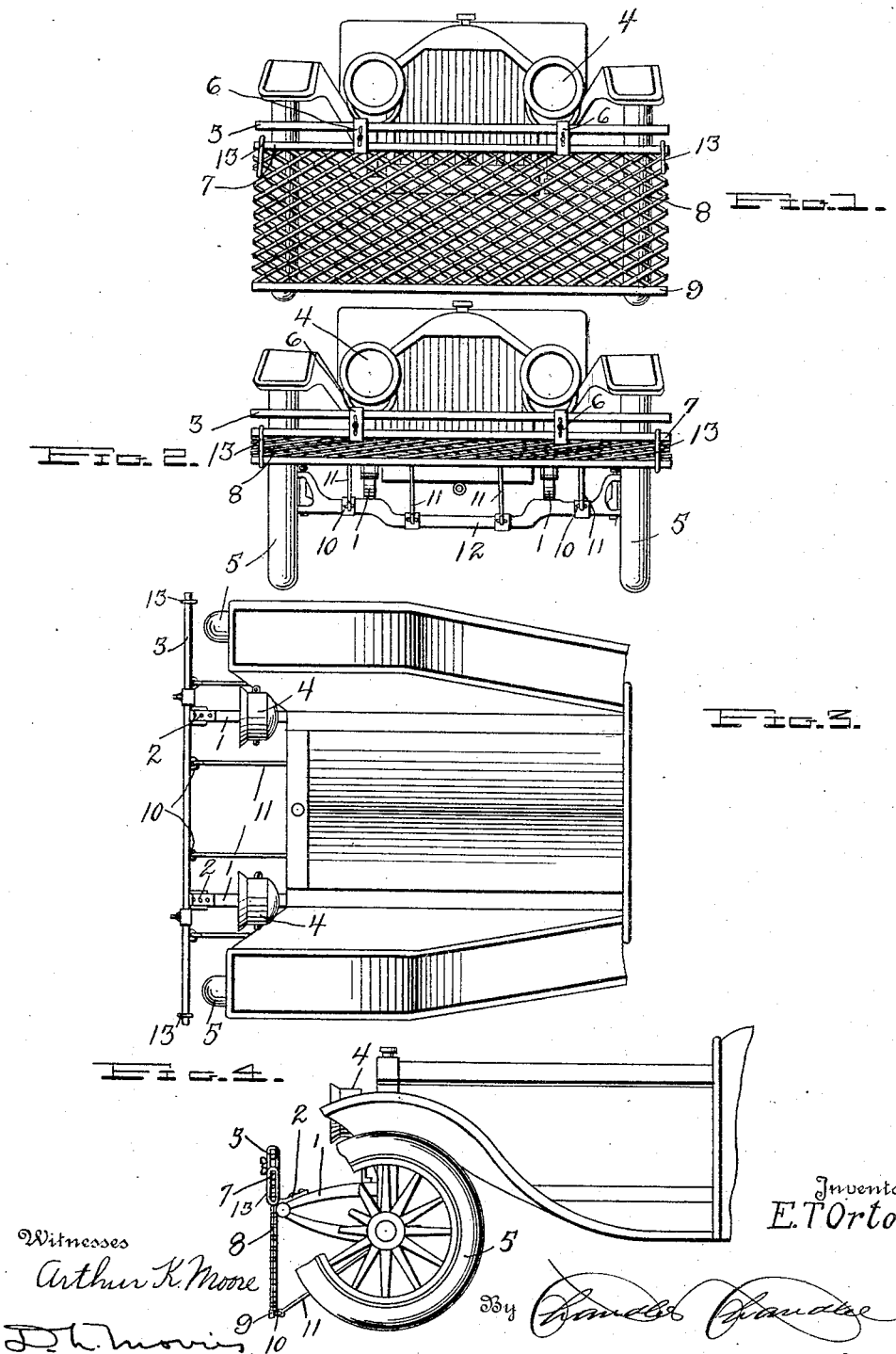

UNITED STATES PATENT OFFICE.

ELIZABETH T. ORTON, OF NEW YORK, N. Y.

FENDER FOR AUTOMOBILES.

1,205,381.  Specification of Letters Patent.  Patented Nov. 21, 1916.

Application filed August 25, 1914, Serial No. 858,514. Renewed October 2, 1916. Serial No. 123,449.

*To all whom it may concern:*

Be it known that I, ELIZABETH T. ORTON, a citizen of the United States, residing at New York, in the county of New York, State of New York, have invented certain new and useful Improvements in Fenders for Automobiles; and I do hereby declare the following to be a full, clear, and exact description of the invention, such as will enable others skilled in the art to which it appertains to make and use the same.

This invention relates to a fender for automobiles.

An object of the invention is to so construct a device of this character which may be readily attached to the front of an automobile and will effectively prevent bodies from passing beneath the same.

A further object of the invention is to construct the device that it may be readily folded during the cranking of the machine and held in such folded position.

With these and other objects in view, such as will appear as the description progresses, my invention comprises the combination and arrangement of parts as herein set forth and subsequently claimed.

Referring to the drawing: Figure 1 is a front elevation of my device shown in place upon an automobile, the said device being shown in its open position. Fig. 2 is a similar view of the device shown in its closed position. Fig. 3 is a plan view of the device. Fig. 4 is a side elevation.

Referring to the drawing wherein like parts are indicated by like characters throughout the several views: Secured to the forwardly extending side frame bars 1 of the automobile by braces 2 is a cross bar 3 which is located below the head-lights 4. The said bar 3 extends outwardly beyond the wheels 5 and in front of the same. Detachably secured to this bar 3 by a clasp 6 is a second bar 7 which is spaced from the first mentioned bar 3 and below the same. To this bar 7 is secured a wire fender 8, the wires of which are so arranged and attached to each other that when the lower edge of the said fender is pushed upwardly they will fold one upon the other. Secured to the lower edge of this wire fender 8 is a cross bar 9 having a plurality of eyes 10 formed on the rear thereof. Detachably secured to these eyes 10 are brace bars 11 which are, at their other ends, pivotally secured to the axle 12 of the front wheels. In order that the lower bar 9 may be held in its uppermost position with the wires of the fender folded between the same and the cross bar 7, I have provided on the ends of the bar 3 pivotally supported loops 13 which are adapted to be swung and to engage the end of the said bar 9. The fender is held in this position during the time which the engine is being cranked and I have made the fender collapsible in order that the crank may be readily reached and operated.

From the foregoing description it may be readily seen that I have provided a fender for automobiles which will be collapsible and one which may be maintained in its collapsed position when desirable and I have further provided means for maintaining the fender in its operative position.

While I have described and illustrated a particular embodiment of my invention, I wish it to be understood that I do not wish to be limited to that particular embodiment for it is obvious that numerous changes may be made within the scope of the invention as defined by the claims.

What is claimed is:—

1. In combination, a cross bar adapted to be secured to the side frame bars on the front end of an automobile and extend horizontally, a plurality of clasps on the said cross bar, a second bar detachably secured to the first mentioned bar by means of said clasps, a collapsible fender secured to said last mentioned bar and extending downwardly therefrom, a bar on the lower end of said fender, loops on the ends of the said first-mentioned cross bar adapted to engage the last mentioned bar and maintain the same in its raised position, eyes on the rear of the first mentioned bar and brace bars detachably connected to said eyes and adapted to be connected to the front axle of the automobile.

2. In combination, a cross bar adapted to be secured to the side frame bars on the front end of an automobile and extend horizontally, a second bar secured to the first mentioned bar, a collapsible fender secured to the second bar, a bar secured to the lower edge of the fender and brace bars detachably connected with the last mentioned bar and adapted to be pivotally connected to the axle of the automobile.

In testimony whereof I affix my signature, in the presence of two witnesses.

ELIZABETH T. ORTON.

Witnesses:
JOHN A. BINGHAM,
WM. F. MURPHY.